United States Patent
Chen et al.

(10) Patent No.: US 6,608,754 B2
(45) Date of Patent: Aug. 19, 2003

(54) FIXING DEVICE FOR POWER SUPPLY UNIT IN COMPUTER COVER

(75) Inventors: Ku-Feng Chen, Taipei (TW); Yu-Lin Chen, Taipei (TW)

(73) Assignee: Quanta Computer Inc. (TW)

( * ) Notice: Subject to any disclaimer, the term of this patent is extended or adjusted under 35 U.S.C. 154(b) by 81 days.

(21) Appl. No.: 10/040,073

(22) Filed: Jan. 2, 2002

(65) Prior Publication Data

US 2003/0043549 A1 Mar. 6, 2003

(30) Foreign Application Priority Data

Sep. 3, 2001 (TW) ...................................... 90215098 U

(51) Int. Cl.[7] ............................................... G06F 1/16
(52) U.S. Cl. ...................... 361/724; 361/725; 361/729; 312/223.1; 248/694
(58) Field of Search .................... 361/683, 724–729, 361/759, 740, 796–797, 801–803, 825, 836; 312/223.1, 223.2, 223.5, 228.1, 223.3, 299.1; 248/220.22, 222.52, 231.9, 694; 174/35 GC, 66, 52.1, 35 R; 403/154, 150, 155; 360/92.01, 98.01, 132, 137 D, 99.06; 369/75.1–82; 16/266, 268, 271

(56) References Cited

U.S. PATENT DOCUMENTS

| | | | |
|---|---|---|---|
| 5,777,848 A | * 7/1998 | McAnally et al. | 361/725 |
| 6,229,696 B1 | * 5/2001 | Lin et al. | 361/683 |
| 6,246,571 B1 | * 6/2001 | Lin et al. | 361/683 |
| 6,247,767 B1 | * 6/2001 | Liu et al. | 312/223.2 |
| 6,270,046 B1 | * 8/2001 | Liu et al. | 248/231.9 |
| 6,288,332 B1 | * 9/2001 | Liu et al. | 174/52.1 |
| 6,288,901 B1 | * 9/2001 | Liu et al. | 361/724 |
| 6,330,139 B1 | * 12/2001 | Liao | 361/86 |
| 6,341,072 B1 | * 1/2002 | Liao | 361/825 |
| 6,483,696 B1 | * 11/2002 | Gan | 361/683 |
| 6,530,628 B1 | * 3/2003 | Huang et al. | 312/223.2 |

FOREIGN PATENT DOCUMENTS

DE 29713123 U1 * 10/1997 .............. G06F/1/18

* cited by examiner

Primary Examiner—Michael Datskovsky
(74) Attorney, Agent, or Firm—Paul L. Hickman; Jonathan P. Kudla; Perkins Coie LLP

(57) ABSTRACT

A fixing device is described. The fixing device is for fixing a power supply unit in a computer cover having a first side plate and a second side plate. The first side plate has a square orifice and a guide slot connecting to the square orifice. The fixing device comprises a rotary-tightening-up device. The rotary-tightening-up device, made of plastic, has a first side member and a second side member. The fixing device further comprises plastic hook connected to the rotary-tightening-up device. The plastic hook is guided by the guide slot, thereby rotating the rotary-tightening-up device to mount the power supply unit upon the second side plate of the computer cover.

9 Claims, 4 Drawing Sheets

FIXING DEVICE FOR POWER SUPPLY UNIT IN COMPUTER COVER

CROSS REFERENCE TO RELATED APPLICATIONS

The present application claims priority from Taiwan Patent Application No. 090215098, filed Sep. 3, 2001, incorporated herein by reference.

FIELD OF THE INVENTION

The present invention relates to computer equipment. More particularly, it relates to a fixing device for fixing a power supply unit.

BACKGROUND OF THE INVENTION

A conventional power supply unit is installed with standard commercially sold products such as tongue pieces through tap holes in a computer cover. Besides being limited in two directions with the above tongue pieces, the power supply unit is further fixed in a third direction by screws.

However, when post-sales service is performed, or when the user maintains the computer himself, these screws are quite troublesome because they are easily missed due to their small size. Therefore, there is a need for devices through which a power supply unit is easily and stably installed or removed without the trouble of missing screws.

SUMMARY OF THE INVENTION

It is an object of this invention to provide a fixing device without screws. The fixing device is for fixing a power supply unit in a computer cover having a first side plate and a second side plate, wherein the first side plate has a square orifice and a guide slot connecting to the square orifice. The fixing device comprises a plastic hook and a rotary-tightening-up device. The rotary-tightening-up device, made of plastic, has a first side member and a second side member. The plastic hook, connected to the rotary-tightening-up device, can be guided by the guide slot, thereby rotating the rotary-tightening-up device to mount the power supply unit upon the second side plate of the computer cover.

According to a preferred embodiment of the present invention, the first side member is fastened in the square orifice through being guided by the guide slot, thereby rotating the rotary-tightening-up device away from the power supply unit, for removing the power supply unit from the second side plate of the computer cover.

In another aspect of the present invention, an assembly is provided for mounting or removing a power supply unit on a computer cover having a second side plate and a second side plate. The first side plate has a first hole, a second hole and a guide slot connecting to the first hole. The assembly comprises a first plastic hook, a rotary-tightening-up device and a second plastic hook. The rotary-tightening-up device, made of plastic, has a first side member, a second side member and a rounded-margin angle. On the other hand, the second plastic hook is connected to the rotary-tightening-up device through the second hole to serve as a rotary axis of the rotary-tightening-up device.

According to a preferred embodiment of the present invention, the rotary-tightening-up device may further comprise a switcher for rotating the rotary-tightening-up device to install the power supply unit, sthereby pressing the rotary-tightening-up device onto the second side plate of the computer cover, and for rotating the rotary-tightening-up device to remove the power supply unit, thereby releasing the power supply unit from the second side plate of the computer cover until the first plastic hook is in the first hole.

By using the present invention, the power supply unit can be quickly installed or removed without using any screws. Moreover, the fixing device can be applied to not only a personal computer but also a server.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
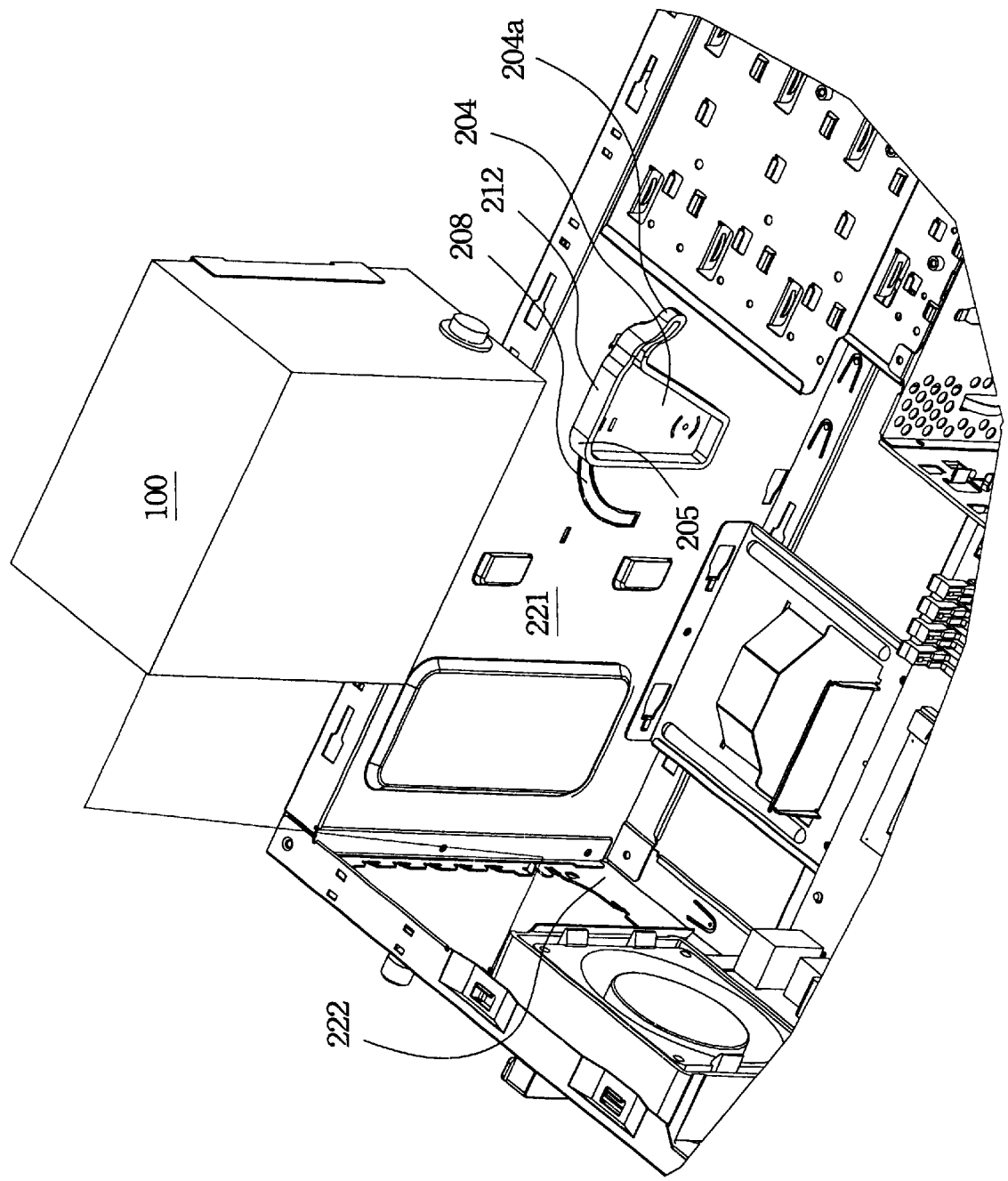
FIG. 1 is a three-dimensional view schematically illustrating a power supply unit and the fixing device thereof according to a preferred embodiment the present invention
Figure 3:
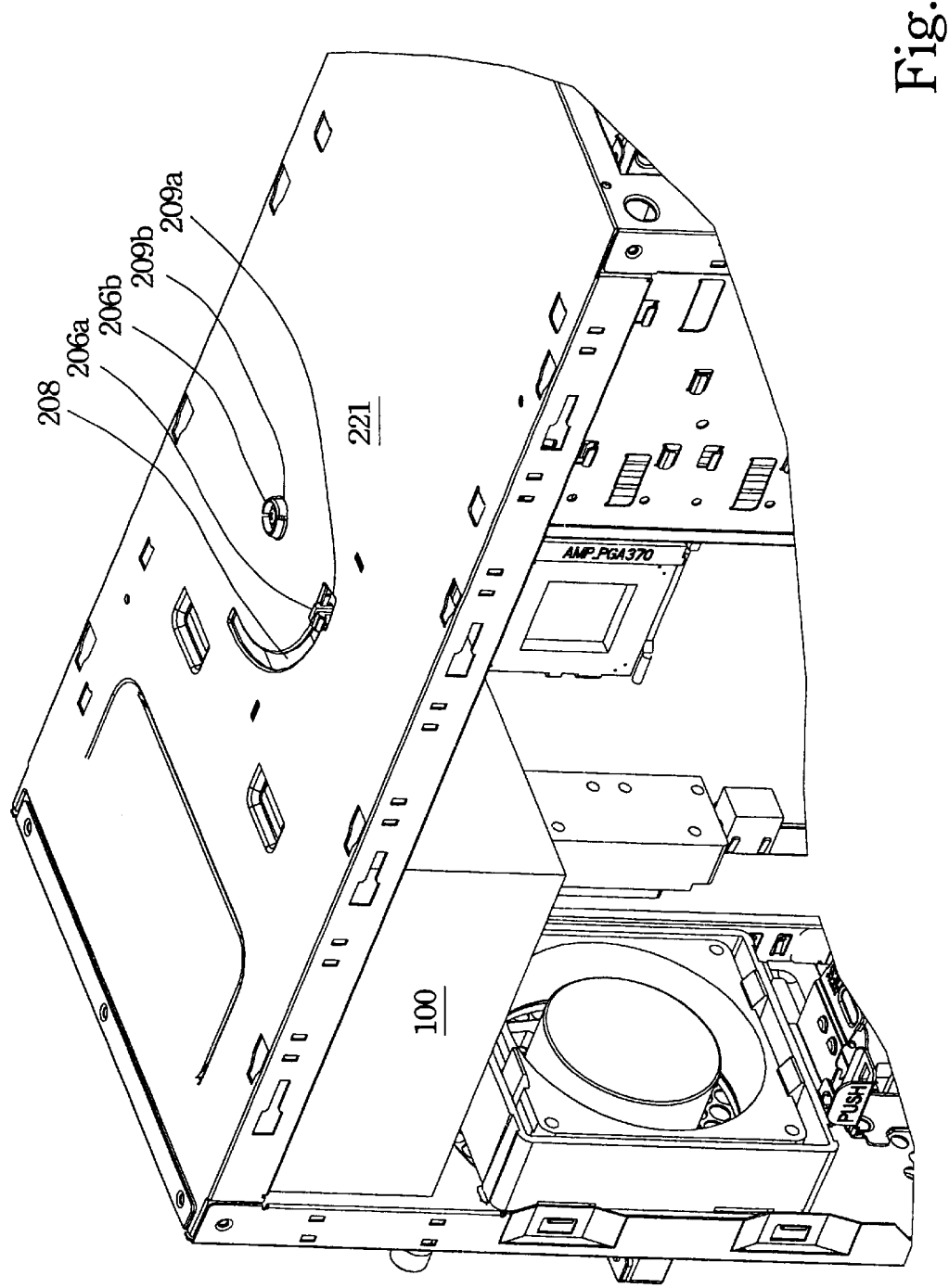
FIG. 3 is a three-dimensional view schematically illustrating the first side plate of the computer cover according to a preferred embodiment the present invention.
Figure 4:
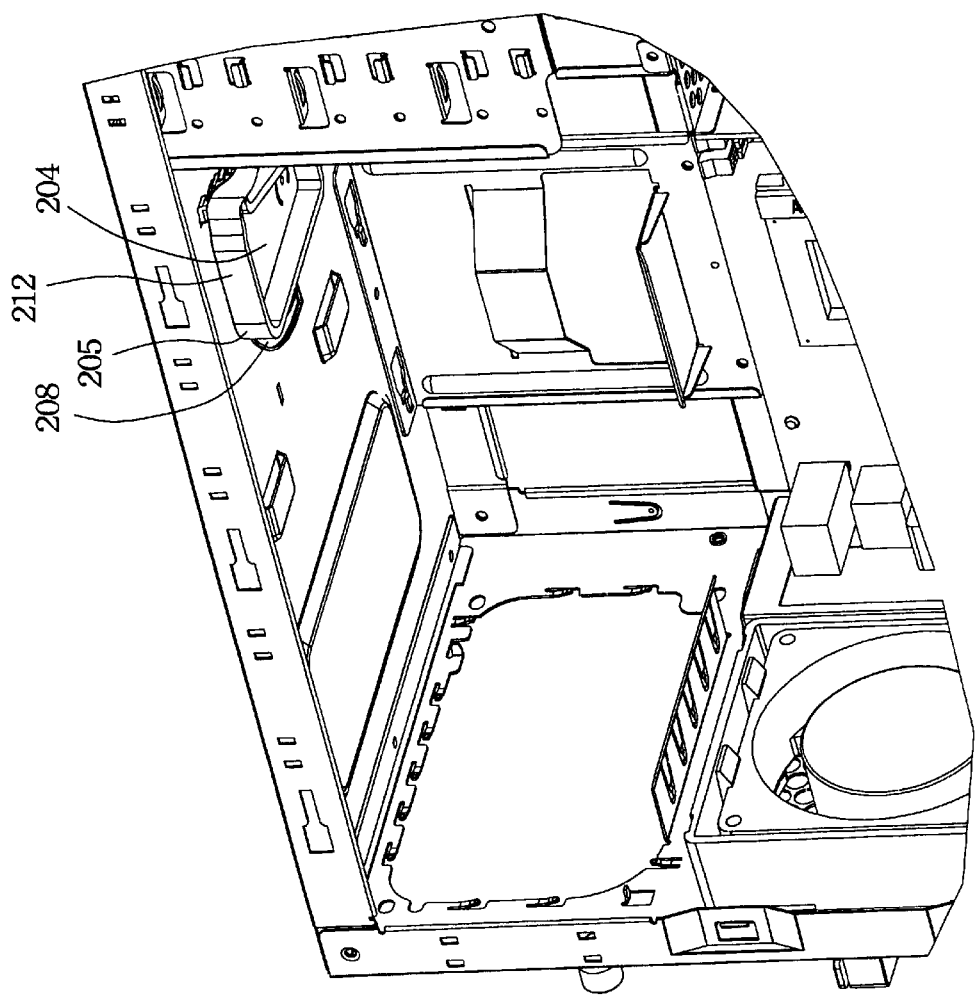
FIG. 4 is a three-dimensional view schematically illustrating a power supply unit and the fixing device thereof according to a preferred embodiment the present invention.

FIG. 1 and FIG. 4 are three-dimensional views schematically illustrating a power supply unit and the fixing device thereof according to a preferred embodiment the present invention. Referring to FIG. 1 and FIG. 4, the present invention provides a fixing device without screws, for fixing a power supply unit 100 in a computer cover. The computer cover has a first side plate 221 and a second side plate 222, wherein the first side plate 221 has a square orifice 209a (FIG. 3) and a guide slot 208 connecting to the square orifice 209a. Moreover, the first side plate 221 may further comprise a circular hole 209b (FIG. 3). Note that the shapes of the square orifice 209a, guide slot 208 and circular hole 209b in the drawings are illustrations rather than limitations of the present invention. Modifications and similar structures achieving the functions the square orifice 209a, guide slot 208 and circular hole 209b are within the spirit and scope of the present invention.

Referring to FIG. 1, the fixing device without screws can comprise a first plastic hook 206a (FIG. 3) and a rotary-tightening-up device 204 made of plastic. The rotary-tightening-up device 204 may have a first side member 211 (FIG. 2) and a second side member 212, and may further have a switcher 204a and a rounded-margin angle 205.

FIG. 3 is a three-dimensional view schematically illustrating the first side plate of the computer cover according to a preferred embodiment the present invention. Referring to both FIG. 3 and FIG. 1, to install the power supply unit, the first plastic hook 206a connected to the rotary-tightening-up device 204 is guided by the guide slot 208, thereby moving the second side member 212 of the rotary-tightening-up device 204. On the other hand, to remove the rotary-tightening-up device, the first plastic hook 206a connected to the rotary-tightening-up device 204 is guided by the guide slot 208, thereby moving the rotary-tightening-up device away from the power supply unit, until the first plastic hook is in the first hole.

Referring to FIG. 3, the fixing device can further comprise a second plastic hook 206b. The second plastic hook 206b, connected to the rotary-tightening-up device through the second hole, serves as a rotary axis of the rotary-tightening-up device.

Function and Operation Method

Figure 2:
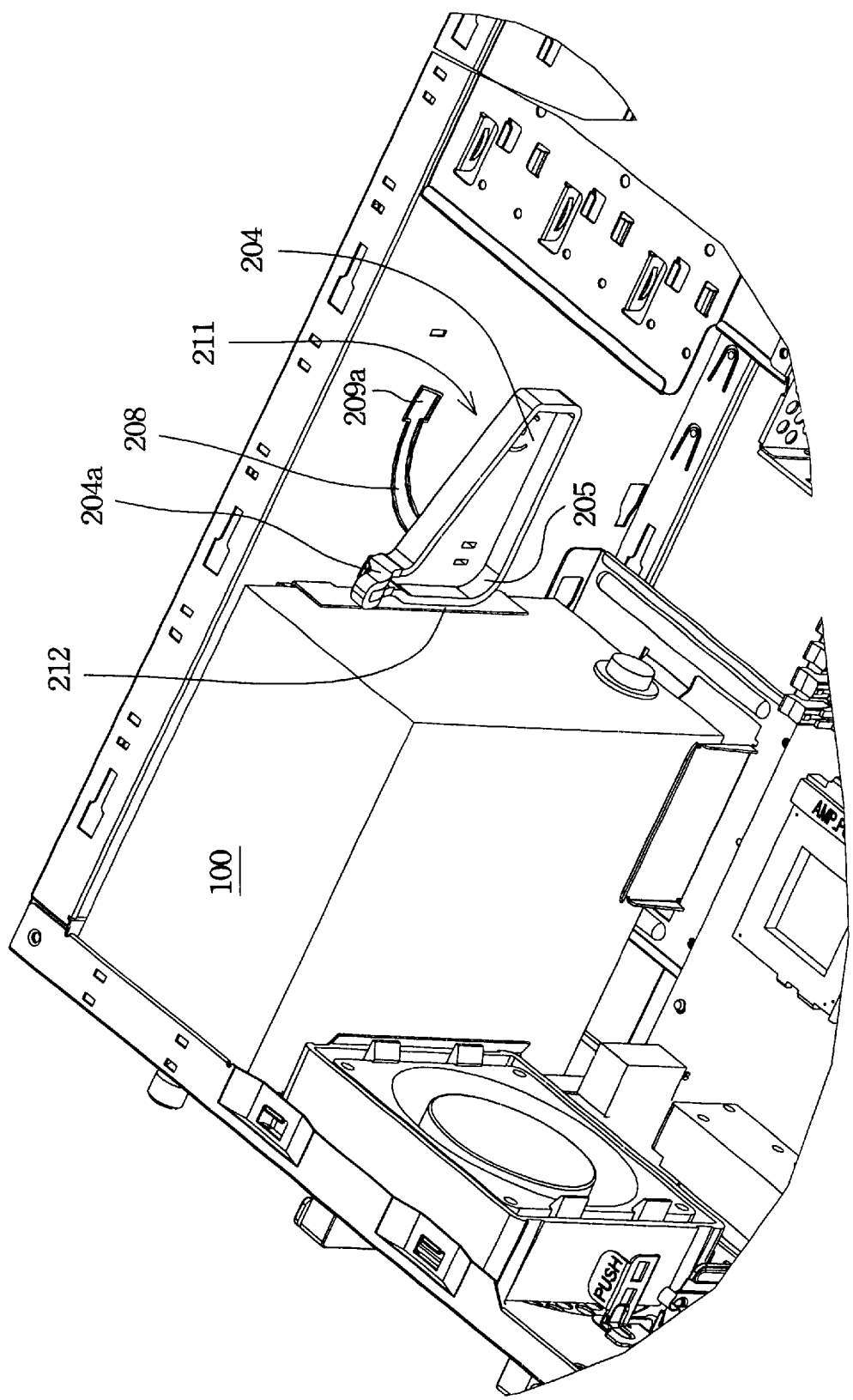
FIG. 2 is a three-dimensional view schematically illustrating a power supply unit before it is removed or after it is installed according to a preferred embodiment the present invention.

FIG. 1 and FIG. 2 are three-dimensional views schematically illustrating a power supply unit being installed and removed according to a preferred embodiment the present invention. Referring to FIG. 1 and FIG. 2, during installation of the power supply unit, the power supply unit 100 is located in the corner of the computer cover. The power supply unit 100 is located by, for example, pressing the power supply unit 100 onto the first side plate 221 and the second side plate 222. The first plastic hook 206a (FIG. 3) is in the square orifice 209a of the first side plate 221, whereby the first side plate 211 (FIG. 2) of the rotary-tightening-up device 204 is approximately adjacent to the first side plate 221 of the computer cover.

Thereafter, the switcher 204a of the rotary-tightening-up device 204 is manipulated to rotate the second side member 212 of the rotary-tightening-up device 100 toward the power supply unit 100 with the second plastic hook 206b serving as a rotary axis. During manipulation, the first plastic hook 206a (FIG. 3) is moved in the guide slot 208 of the first side plate 221. As the first plastic hook 206a is moved, the rounded-margin angle 205 of the rotary-tightening-up device 204 hits the power supply unit 100. If the second side member 212 of the rotary-tightening-up device 100 continues to rotate after the rounded-margin angle 205 hits the power supply unit 100, the second side member 212 of the rotary-tightening-up device 204 will be substantially adjacent to the power supply unit 100. The power supply unit 100 is thereby pressed onto the second side plate 222 of the computer cover to fix the power supply unit 100 in place.

FIG. 2 and FIG. 1 are three-dimensional views schematically illustrating a power supply unit before it is removed and after it is removed according to a preferred embodiment the present invention. Referring to FIG. 2 and FIG. 1, to remove the power supply unit, the switcher 204a is manipulated to rotate the rotary-tightening-up device 204 with the second plastic hook 206b serving as a rotary axis. Second side member 212 (originally rotated toward the power supply unit 100) thereby moves away from the power supply unit 100. In this operation, the first plastic hook 206a (FIG. 3) is moved in the guide slot 208 of the first side plate 221 until the first plastic hook 206a is in the square orifice 209a, by which movement the power supply unit 100 is released from the second side plate 212 of the computer cover.

To sum up, the present invention provides a fixing device without screws, for fixing a power supply unit in a computer cover having a first side plate and a second side plate. The first side plate has a square orifice and a guide slot connecting to the square orifice. The fixing device may have the following points:

1. The fixing device substantially has a rotary-tightening-up device and a first plastic hook connected to the rotary-tightening-up device. The first plastic hook is guided by the guide slot, thereby rotating the rotary-tightening-up device to mount the power supply unit on the side plate of the computer cover.

2. When removing the power supply unit, the first plastic hook is guided in the guide slot, whereby the rotary-tightening-up device is rotated, thereby releasing the rotary-tightening-up device from the second side plate of the computer cover until the first plastic hook is in the first hole. No tool or screw is used in such an operation.

The present invention may have advantages as follows:

1. By using the fixing device of the present invention, the power supply unit can be easily and reliably mounted in a computer or removed from the computer when a follow-up service for the computer is performed or the computer is maintained by the user.

2. The present invention reduces the use of screws in the computer. It is noted that screws are easily lost when they are removed during computer maintenance. Therefore, if the use of screws is reduced, screw-loss problems are simultaneously reduced.

3. The present invention uses no screw or tool to install and remove the power supply unit.

As is understood by a person skilled in the art, the foregoing preferred embodiments of the present invention are illustrations of the present invention rather than limitations of the present invention. It is intended to cover various modifications and similar arrangements included within the spirit and scope of the appended claims, the scope of which should be accorded the broadest interpretation so as to encompass all such modifications and similar structure.

What is claimed is:

1. A fixing device without screws, for fixing a power supply unit in a computer cover having a first side plate and a second side plate, wherein the first side plate has a square orifice and a guide slot connecting to the square orifice, the fixing device comprising:

a rotary-tightening-up device, made of plastic, having a first side member and a second side member; and a plastic hook, being connected to the rotary-tightening-up device, the plastic hook being guided by the guide slot, thereby rotating the rotary-tightening-up device to mount the power supply unit upon the second side plate of the computer cover.

2. The fixing device of claim 1, wherein the first side member is fastened in the square orifice through being guided by the guide slot, thereby rotating the rotary-tightening-up device away from the power supply unit to remove the power supply unit from the second side plate of the computer cover.

3. A fixing device for fixing a power supply unit in a computer cover having a first side plate and a second side plate, wherein the first side plate has a circular hole, a square orifice and a guide slot connecting to the square orifice, the fixing device comprising:

a rotary-tightening-up device, made of plastic, having a first side member, a second side member, a rounded-margin angle and a switcher; and a first plastic hook connected to the rotary-tightening-up device.

4. The fixing device of claim 1, further comprising a second plastic hook connected to the rotary-tightening-up device through the circular hole, for serving as a rotary axis of the rotary-tightening-up device.

5. The fixing device of claim 3, wherein the first plastic hook is moved in the guide slot when the rotary-tightening-up device is rotated.

6. An assembly for mounting or dismounting a power supply unit in a computer cover having a first side plate and a second side plate, wherein the first side plate has a first hole, a second hole and a guide slot connecting to the first hole, the assembly comprising:

a first plastic hook;

a rotary-tightening-up device, made of plastic, having a first side member, a second side member and a rounded-margin angle; and a second plastic hook, connected to the rotary-tightening-up device through the second hole, for serving as a rotary axis of the rotary-tightening-up device.

7. The assembly of claim 6, wherein the rotary-tightening-up device further comprises a switcher, for rotating the rotary-tightening-up device to mount the power supply unit on the computer cover, thereby pressing the power supply onto the second side plate of the computer cover, and for rotating the rotary-tightening-up device to remove the power supply unit, thereby releasing the power supply unit from the second side plate of the computer cover until the first plastic hook is in the first hole.

8. The assembly of claim 6, wherein the first hole is a square orifice.

9. The assembly of claim 6, wherein the second hole is a circular hole.

* * * * *